(12) United States Patent
Li et al.

(10) Patent No.: US 11,909,322 B2
(45) Date of Patent: Feb. 20, 2024

(54) ISOLATION TYPE POWER CONVERSION METHOD BASED ON DEMAGNETIZATION ITERATION CONTROL AND POWER CONVERSION CIRCUIT

(71) Applicant: WUXI SI-POWER MICRO-ELECTRONICS CO., LTD., Jiangsu (CN)

(72) Inventors: Ye Li, Jiangsu (CN); Feiming Huang, Jiangsu (CN); Jie He, Jiangsu (CN)

(73) Assignee: WUXI SI-POWER MICRO-ELECTRONICS CO., LTD., Jiangsu (CN)

( * ) Notice: Subject to any disclaimer, the term of this patent is extended or adjusted under 35 U.S.C. 154(b) by 0 days.

(21) Appl. No.: 17/781,043

(22) PCT Filed: Jan. 5, 2021

(86) PCT No.: PCT/CN2021/070316
§ 371 (c)(1),
(2) Date: Aug. 19, 2023

(87) PCT Pub. No.: WO2022/121073
PCT Pub. Date: Jun. 16, 2022

(65) Prior Publication Data
US 2023/0387809 A1 Nov. 30, 2023

(30) Foreign Application Priority Data
Dec. 11, 2020 (CN) .......................... 202011442359.6

(51) Int. Cl.
*H02M 3/335* (2006.01)
(52) U.S. Cl.
CPC ... *H02M 3/33523* (2013.01); *H02M 3/33592* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS

| 7,310,247 B1 | 12/2007 | Lin et al. |
| 9,647,541 B2 * | 5/2017 | Fan .................... H02M 3/33507 |

(Continued)

FOREIGN PATENT DOCUMENTS

| CN | 105450029 A | 3/2016 |
| CN | 106533214 A | 3/2017 |

(Continued)

OTHER PUBLICATIONS

First Office Action dated Sep. 3, 2021 for Chinese patent application No. 202011442359.6.

(Continued)

*Primary Examiner* — Jeffrey A Gblende
(74) *Attorney, Agent, or Firm* — Yue (Robert) Xu; Apex Attorneys at Law, LLP

(57) ABSTRACT

Disclosed are an isolation type power conversion method based on demagnetization iteration control and a power conversion circuit. The power conversion circuit comprises a high-frequency transformer, wherein a primary side of the high-frequency transformer is electrically connected with a primary side power tube in a power switch tube circuit, a secondary side of the high-frequency transformer is electrically connected with a charging capacitor circuit and an output feedback circuit through a secondary side synchronous rectifier tube, and the primary side and the secondary side of the high-frequency transformer are electrically connected with a power conversion integrated control chip. The present invention provides a novel demagnetization time iteration loop control architecture, which controls the (Continued)

switching of the primary side power tube by iteratively calculating the demagnetization time, and the method eliminates the right-half-plane zero of a flyback isolation power supply, increases the loop bandwidth and improves the response speed of the system. The influence of signal noise interference during high-speed dynamic response is eliminated through a ripple injection method, and a voltage adaptive turn-on time control technology is adopted, so that a primary side current sampling resistor is omitted, the system cost is reduced, and the system reliability is improved.

9 Claims, 5 Drawing Sheets

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; Y02B 70/1491
See application file for complete search history.

(56) References Cited

U.S. PATENT DOCUMENTS

| | | | |
|---|---|---|---|
| 9,755,530 B2* | 9/2017 | Luo | H02M 3/33592 |
| 10,944,330 B1* | 3/2021 | Lee | H02M 3/33576 |
| 11,502,601 B2* | 11/2022 | Chang | H02M 3/156 |
| 11,527,962 B2* | 12/2022 | Kong | H02J 7/06 |
| 2016/0172985 A1 | 6/2016 | Arima et al. | |
| 2019/0341852 A1 | 11/2019 | Fahlenkamp et al. | |
| 2020/0274454 A1 | 8/2020 | Bucheru | |

FOREIGN PATENT DOCUMENTS

| | | |
|---|---|---|
| CN | 109087774 A | 12/2018 |
| CN | 109980944 A | 7/2019 |
| CN | 211127612 U | 7/2020 |
| CN | 111525806 A | 8/2020 |
| CN | 213637509 U | 7/2021 |

OTHER PUBLICATIONS

International Search Report of PCT/CN2021/070316 dated Sep. 9, 2021, ISA/CN.

* cited by examiner

ISOLATION TYPE POWER CONVERSION METHOD BASED ON DEMAGNETIZATION ITERATION CONTROL AND POWER CONVERSION CIRCUIT

This application is the national phase of International Application No. PCT/CN2021/070316, titled "ISOLATION TYPE POWER CONVERSION METHOD BASED ON DEMAGNETIZATION ITERATION CONTROL AND POWER CONVERSION CIRCUIT", filed on Jan. 05, 2021, which claims the priority to Chinese Patent Application No. 202011442359.6, titled "ISOLATION TYPE POWER CONVERSION METHOD BASED ON DEMAGNETIZATION ITERATION CONTROL AND POWER CONVERSION CIRCUIT", filed on Dec. 11, 2020 with the Chinese Patent Office, both of which are incorporated herein by reference in their entireties.

FIELD

The present invention belongs to the field of integrated circuits related to power conversion control circuits, and relates to a switching power supply control technology, in particular to an isolation type power conversion method based on demagnetization iteration control and a power conversion circuit.

BACKGROUND

Along with the rapid development of 5G communication, Internet of Things, smart home and the like, the sales to dealers of electronic products such as mobile phones, PADs, small household appliances, network equipment and the like are increased suddenly, thus driving related power supply chips to rapidly grow year by year.

An isolated power converter realizes energy transfer through an electromagnetic conversion mode of the high-frequency transformer, and its characteristic of electrical isolation prevents a high-voltage input domain from harming low-voltage equipment or a human body, so that the isolated power converter is widely used in a power supply system of electronic equipment. A flyback isolation power supply becomes a mainstream application of a medium and small power section isolation power supply due to its simple application structure and low cost. A feedback control signal of the flyback isolation power supply is usually transmitted by a main high-frequency transformer or an optocoupler and other devices, the system response of the control signal transmitted by the main high-frequency transformer may lag behind one switching cycle, while the transmission speed of the control signal transmitted by the optocoupler is slow, which may affect the system response. Besides, a flyback isolation power supply of a conventional architecture has a right-half-plane zero, and the problem of system stability is often solved by reducing the loop bandwidth in application, so that the loop dynamic response speed is relatively slow.

SUMMARY

One objective of the present invention is to overcome the defects in the prior art, and provide an isolation type power conversion method based on demagnetization iteration control and a power conversion circuit.

In order to achieve the purpose, the present invention provides an isolation type power conversion method based on demagnetization iteration control, which comprises the following steps:

Step 1, a high-frequency transformer circuit of a power conversion circuit comprising a high-frequency transformer, at the beginning of power-on, a secondary side control circuit of the high-frequency transformer maintaining a turn-off state, a primary side control circuit of the high-frequency transformer comprising an oscillator module, a one-out-of-two selector and an adaptive turn-on time control circuit, the oscillator module in the primary side control circuit triggering the adaptive turn-on time control circuit through a '0' input end of the one-out-of-two selector, the adaptive turn-on time control circuit controlling a primary side power tube in a power switch tube circuit electrically connected with the adaptive turn-on time control circuit to be turned on so as to enable the high-frequency transformer to enter an excitation stage, and the high-frequency transformer charging a secondary side power supply capacitor in a charging capacitor circuit electrically connected to a secondary side of the high-frequency transformer in the excitation stage through a power supply unit in the secondary side control circuit;

Step 2, when the adaptive turn-on time control circuit controls the primary side power tube in the power switch tube circuit to be turned off, the high-frequency transformer entering the demagnetization stage, the high-frequency transformer charging an output capacitor in the charging capacitor circuit electrically connected to the secondary side of the high-frequency transformer in the demagnetization stage, and at the moment, the secondary side control circuit still maintaining the turn-off of a secondary side synchronous rectifier tube electrically connected with the secondary side of the high-frequency transformer so as to prevent a primary side and the secondary side of the high-frequency transformer from being turned on at the same time;

Step 3, after a plurality of continuous excitation stages under the control of the oscillator module and the adaptive turn-on time control circuit are completed, and a charging voltage of the secondary side power supply capacitor reaches a set threshold value, the secondary side control circuit sending a pulse communication signal to the primary side control circuit through a high-voltage capacitor isolation circuit by using a control signal modulation circuit located in the secondary side control circuit in order to establish communication handshake with the primary side control circuit in the demagnetization stage, the one-out-of-two selector in the primary side control circuit selecting the demodulated communication signal obtained by a '1' input end all the time to trigger the adaptive turn-on time control circuit only after the handshake is successful, therefore, the turn-on and turn-off of the secondary side synchronous rectifier tube and the primary side power tube controlled by the adaptive turn-on time control circuit being both only controlled by the secondary side control circuit, if the primary side control circuit does not receive a communication handshake signal of the secondary side control circuit all the time, and after the primary side control circuit controls the primary side power tube for dozens of switching cycles by using the oscillator module, a logic circuit which is arranged in the oscillator module and functions as a microcontroller controlling the oscillator module to stop outputting the signal so as to cause the primary side control circuit to be automatically turned off, and repeating Step 1 to restart the system;

Step 4, summing a feedback voltage value of an output feedback circuit of the secondary side of the high-frequency transformer and an output signal of the ripple injection module, comparing an obtained summed voltage value with a reference voltage value of a reference voltage circuit in the secondary side control circuit, and when two conditions that, the summed voltage value is smaller than the reference voltage value of the reference voltage circuit, and the demagnetization time of the current cycle is greater than or equal to the difference between the demagnetization time of the previous cycle and the iteration error amount, namely $Tdem^n \geq Tdem^{n-1} - \Delta Tdem$, wherein in the formula, $Tdem^n$ is the demagnetization time of the nth switching with the unit being microsecond;

$Tdem^{n-1}$ is the demagnetization time of the (n−1)th switching with the unit being microsecond;

$\Delta Tdem$ is the iteration error amount with the unit being nanosecond;

are met, a demagnetization time iteration control unit in the secondary side control circuit firstly turning off the secondary side synchronous rectifier tube through a secondary side turn-off/turn-on unit in the secondary side control circuit, and then sending a TX turn-on signal to the primary side control circuit through the control signal modulation circuit located in the secondary side control circuit after delaying for several nanoseconds; the signal being coupled by the high-voltage capacitor isolation circuit and demodulated by a control signal demodulation circuit in the primary side control circuit to generate an RX signal, then the RX signal being input into the adaptive turn-on time control circuit located in the primary side control circuit, the adaptive turn-on time control circuit controlling the primary side power tube to be turned on, and then the high-frequency transformer obtaining excitation storage energy; meanwhile, the adaptive turn-on time control circuit calculating the turn-on time of the primary side power tube according to a primary side bus voltage VIN parameter of the high-frequency transformer and automatically turning off the primary side power tube after the time is reached, so as to enable the high-frequency transformer to enter the demagnetization stage to output energy to the secondary side; the secondary side control circuit turning on the secondary side synchronous rectifier tube through the secondary side turn-off/turn-on unit included in the secondary side control circuit, thereby ensuring that a load end of the secondary side of the high-frequency transformer obtains energy supply; and Step 5, detecting a feedback voltage of the output feedback circuit at the load end of the secondary side of the high-frequency transformer in real time, and repeating Step 4 to realize energy transfer after power conversion from the primary side of the high-frequency transformer to the secondary side of the high-frequency transformer.

In addition, the embodiments of the present invention can also have the following additional technical features:

the adaptive turn-on time control circuit comprises a voltage division circuit that is electrically connected with primary side bus voltage VIN, and a first voltage-controlled current source circuit that is electrically connected with the voltage division circuit, wherein the first voltage-controlled current source circuit generates bias current in direct proportion to the magnitude of the primary side bus voltage VIN, the first voltage-controlled current source circuit is electrically connected with one end of a first capacitor, one end of a first switch and a positive input end of a second comparator, the first switch is controlled by a first one-shot circuit, the first one-shot circuit is electrically connected with a trigger output end of the one-out-of-two selector in the primary side control circuit, a negative input end of the second comparator is electrically connected with a positive electrode of a first reference voltage source, the other end of the first capacitor, the other end of the first switch, a negative electrode of the first reference voltage source and a negative electrode of the primary side bus voltage VIN share a common ground, an output end of the second comparator is electrically connected with an input end of a phase inverter, and an output end of the phase inverter is electrically connected with a trigger end of the primary side power tube.

The turn-on time Ton of the primary side power tube calculated by the adaptive turn-on time control circuit according to the primary side bus voltage VIN parameter in Step 4 is:

$$Ton = C*V/(1/k*G*VIN),$$

wherein, VIN is primary side bus voltage of an input voltage bus located at the primary side of the high-frequency transformer;

C is the capacitance value of the first capacitor;

V is the voltage value of the first reference voltage source;

1/k is the voltage division coefficient of the voltage division circuit;

G is the transconductance value of the first voltage-controlled current source circuit.

The present invention further provides a power conversion circuit adopting the isolation type power conversion method based on demagnetization iteration control, comprising:

a high-frequency transformer circuit used for voltage conversion transmission in power conversion, wherein the high-frequency transformer circuit comprises a high-frequency transformer, a primary side of the high-frequency transformer is electrically connected with a primary side power tube included in a power switch tube circuit, a secondary side of the high-frequency transformer is electrically connected with a charging capacitor circuit and an output feedback circuit through a secondary side synchronous rectifier tube, the charging capacitor circuit comprises a secondary side power supply capacitor, one end of the secondary side power supply capacitor is electrically connected to a secondary side positive output end of the high-frequency transformer in the excitation stage, the other end of the secondary side power supply capacitor is electrically connected to a negative electrode of a secondary side load output end in the demagnetization stage, the charging capacitor circuit further comprises an output capacitor connected across the secondary side load output end, the output feedback circuit comprises a voltage division resistor $R_{FB1}$ and a voltage division resistor $R_{FB2}$ that are connected in series and are connected across the secondary side load output end, and the primary side and the secondary side of the high-frequency transformer are electrically connected with a power conversion integrated control chip.

The power conversion integrated control chip internally comprises a primary side control circuit, a high-voltage capacitor isolation circuit and a secondary side control circuit, wherein the primary side control circuit is electrically connected with the power switch tube circuit; the secondary side control circuit is electrically connected with the secondary side synchronous rectifier tube, the output feedback circuit and the secondary side positive output end of the high-frequency transformer in the excitation stage, and the secondary side control circuit communicates with the primary side control circuit through the high-voltage capacitor isolation circuit.

the primary side control circuit internally comprises:

an oscillator module, used for providing a working pulse oscillation signal in the primary side control circuit;

a one-out-of-two selector, used for receiving the working pulse oscillation signal output by the oscillator module and receiving a communication signal transmitted by the high-voltage capacitor isolation circuit;

a D trigger, used for receiving the communication signal transmitted by the high-voltage capacitor isolation circuit and outputting a trigger result to a control end of the one-out-of-two selector from an output end; and an adaptive turn-on time control circuit, used for receiving an output signal of the output end of the one-out-of-two selector and controlling the turn-on and turn-off time of the primary side power tube in the power switch tube circuit according to the magnitude of the primary side bus voltage VIN of the high-frequency transformer; wherein the oscillator module is electrically connected with a '0' input end of the one-out-of-two selector, a '1' input end of the one-out-of-two selector is electrically connected with an output end of a control signal demodulation circuit, a Q output end of the D trigger is electrically connected with the control end of the one-out-of-two selector, a D input end of the D trigger is electrically connected with a high level, a time sequence CLK input end of the D trigger is electrically connected with the high-voltage capacitor isolation circuit through the control signal demodulation circuit, and the output end of the one-out-of-two selector is electrically connected with the adaptive turn-on time control circuit included in the primary side control circuit.

the secondary side control circuit internally comprises:

a power supply unit, used for being electrically connected with the secondary side positive output end of the high-frequency transformer in the excitation stage to obtain electric energy, so as to charge the secondary side power supply capacitor in the charging capacitor circuit;

a ripple injection module, used for providing a ripple signal required for summation with a feedback voltage value of the output feedback circuit;

a summator, used for summing the ripple signal and the feedback voltage value of the output feedback circuit;

a demagnetization time iteration control unit, used for realizing communication handshake control and demagnetization time iteration control between the secondary side control circuit and the primary side control circuit through the high-voltage capacitor isolation circuit;

a secondary side turn-off/turn-on unit, used for controlling turn-off/turn-on of the secondary side synchronous rectifier tube and the demagnetization time iteration control unit;

a reference voltage circuit, used for providing a reference voltage value used for being compared with a summation result between the ripple signal and the feedback voltage value of the output feedback circuit;

a first comparator, used for comparing the summation result between the ripple signal and the feedback voltage value of the output feedback circuit with the reference voltage value of the reference voltage circuit; and a control signal modulation circuit, used for modulating a communication handshake signal output by the demagnetization time iteration control unit.

The demagnetization time iteration control unit comprises a second switch and a third switch, wherein a control end of the second switch is electrically connected with an output end of the secondary side turn-off/turn-on unit, a control end of the third switch is electrically connected with the output end of the secondary side turn-off/turn-on unit through a pulse trigger circuit, a first base electrode of the second switch is electrically connected with a second voltage-controlled current source circuit, a second base electrode of the second switch is electrically connected with a first base electrode of the third switch and a positive input end of a third comparator TB, a second base electrode of the third switch and a negative electrode of the secondary side of the high-frequency transformer in the demagnetization stage share a common ground, the second base electrode of the second switch is further electrically connected with a first base electrode of a fourth switch and one end of a second capacitor, a second base electrode of the fourth switch is electrically connected with one end of a third capacitor, the second base electrode of the fourth switch is further electrically connected with a negative electrode of a positive iteration error amount voltage source and a positive electrode of a negative iteration error amount voltage source, a positive electrode of the positive iteration error amount voltage source is electrically connected with a negative input end of the third comparator TB through a fifth switch, a negative electrode of the negative iteration error amount voltage source is electrically connected with the negative input end of the third comparator TB through a sixth switch, an output end of the third comparator TB is electrically connected with a D input end of a second D trigger, a Q output end of the second D trigger is electrically connected with a control end of the fifth switch, a Q non-output end of the second D trigger is electrically connected with a control end of the sixth switch, and a control end of the fourth switch and a CP input end of the second D trigger are both electrically connected with an ONTRIG output end of the first comparator, and the output end of the third comparator TB is also electrically connected with the control signal modulation circuit.

The ripple injection module comprises a seventh switch, wherein a control end of the seventh switch is electrically connected with the ONTRIG output end of the first comparator through a second one-shot circuit, a first base electrode of the seventh switch is electrically connected with one end of a second reference voltage source, a second base electrode of the seventh switch is electrically connected with one end of a fourth capacitor and one end of a first resistor, the second base electrode of the seventh switch is further electrically connected with the summator, and the other end of the second reference voltage source, the other end of the fourth capacitor, the other end of the first resistor and the negative electrode of the secondary side of the high-frequency transformer in the demagnetization stage share a common ground.

According to the isolation type power conversion method based on demagnetization iteration control and the power conversion circuit with the high-speed dynamic response function, through high-voltage isolation signal coupling, control signals generated by the secondary side are transmitted to the primary side in real time so as to control switching of the primary side power tube, and signal transmission delay time is shortened. In addition, The present invention provides a novel demagnetization time iteration loop control architecture, which controls the switching of the primary side power tube by iteratively calculating the demagnetization time, and the method eliminates the right-half-plane zero of a flyback isolation power supply, increases the loop bandwidth and improves the response speed of the system. The influence of signal noise interference during high-speed dynamic response is eliminated through a ripple injection method, and a voltage adaptive turn-on time control technology is adopted, so that a primary side current sampling resistor is omitted, the system cost is reduced, and the system reliability is improved.

Additional aspects and advantages of the present invention will be given in part in the following description, and some will become apparent from the following description, or learned through the practice of the present invention.

BRIEF DESCRIPTION OF THE DRAWINGS

The above and/or additional aspects and advantages of the present invention will become apparent and easy to understand in combination with the description of the embodiments in the following drawings.

Figure 1:
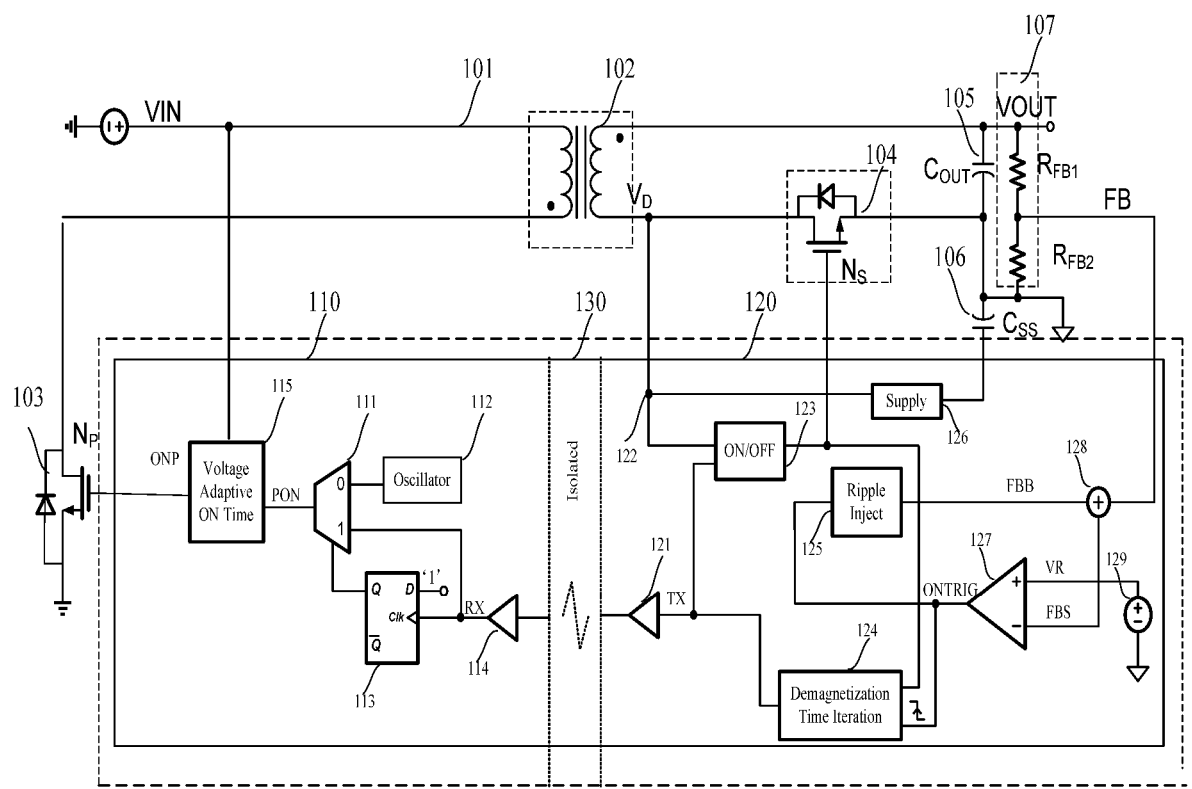
FIG. 1 is a schematic diagram of a system control circuit of a power conversion circuit of the present invention.

Wherein: 101—input voltage bus, 102—high-frequency transformer, 103—primary side power tube, 104—secondary side synchronous rectifier tube, 105—output capacitor, 106—secondary side power supply capacitor, 107—output feedback circuit, 110—primary side control circuit, 111—one-out-of-two selector, 112—oscillator module, 113—D trigger, 114—control signal demodulation circuit, 115—adaptive turn-on time control circuit, 120—secondary side control circuit, 121—control signal modulation circuit, 122—high-level node, 123—secondary side turn-off/turn-on unit, 124—demagnetization time iteration control unit, 125—ripple injection module, 126—power supply unit, 127—first comparator, 128—summator, 129—reference voltage circuit, 130—high-voltage capacitor isolation circuit, 501—voltage division circuit, 502—first voltage-controlled current source circuit, 503—first one-shot circuit, 505—first switch, 506—first capacitor, 507—first reference voltage source, 508—second comparator, 509—phase inverter.

DETAILED DESCRIPTION OF THE EMBODIMENTS

Embodiments of the present invention will be described in detail below, and examples of the embodiments are shown in the drawings, in which the same or similar reference numerals throughout represent the same or similar elements or elements with the same or similar functions. The embodiments described below with reference to the accompanying drawings are exemplary and are only used to explain the present invention and cannot be understood as limitations on the present invention. Further description will be made in combination with the accompanying drawings.

In FIG. 1 to FIG. 7, the present invention provides an isolation type power conversion method based on demagnetization iteration control, comprising the steps:

Step 1, a high-frequency transformer circuit of a power conversion circuit comprising a high-frequency transformer 102, at the beginning of power-on, a secondary side control circuit 120 of the high-frequency transformer 102 maintaining a turn-off state, a primary side control circuit 110 of the high-frequency transformer 102 comprising an oscillator module 112, a one-out-of-two selector 111 and an adaptive turn-on time control circuit 115, the oscillator module 112 in the primary side control circuit 110 triggering the adaptive turn-on time control circuit 115 through a '0' input end of the one-out-of-two selector 111, the adaptive turn-on time control circuit 115 controlling a primary side power tube 103 in a power switch tube circuit electrically connected with the adaptive turn-on time control circuit to be turned on so as to enable the high-frequency transformer 102 to enter an excitation stage, and the high-frequency transformer 102 charging a secondary side power supply capacitor 106 in a charging capacitor circuit electrically connected to a secondary side of the high-frequency transformer in the excitation stage through a power supply unit 126 in the secondary side control circuit 120;

Step 2, when the adaptive turn-on time control circuit 115 controls the primary side power tube 103 in the power switch tube circuit to be turned off, the high-frequency transformer 102 entering the demagnetization stage, the high-frequency transformer 102 charging an output capacitor 105 in the charging capacitor circuit electrically connected to the secondary side of the high-frequency transformer in the demagnetization stage, and at the moment, the secondary side control circuit 120 still maintaining the turn-off of a secondary side synchronous rectifier tube 104 electrically connected with the secondary side of the high-frequency transformer 102 so as to prevent a primary side and the secondary side of the high-frequency transformer 102 from being turned on at the same time;

Step 3, after a plurality of continuous excitation stages under the control of the oscillator module 112 and the adaptive turn-on time control circuit 115 are completed, and a charging voltage of the secondary side power supply capacitor 106 reaches a set threshold value, the secondary side control circuit 120 sending a pulse communication signal to the primary side control circuit 110 through a high-voltage capacitor isolation circuit 130 by using a control signal modulation circuit 121 located in the secondary side control circuit in order to establish communication handshake with the primary side control circuit 110 in the demagnetization stage, the one-out-of-two selector 111 in the primary side control circuit 110 selecting the demodulated communication signal obtained by a '1' input end all the time to trigger the adaptive turn-on time control circuit 115 only after the handshake is successful, therefore, the turn-on and turn-off of the secondary side synchronous rectifier tube 104 and the primary side power tube 103 controlled by the adaptive turn-on time control circuit 115 being both only controlled by the secondary side control circuit 120, if the primary side control circuit 110 does not receive a communication handshake signal of the secondary side control circuit 120 all the time, and after the primary side control circuit 110 controls the primary side power tube 103 for dozens of switching cycles by using the oscillator module 112, a logic circuit which is arranged in the oscillator module 112 and functions as a microcontroller controlling the oscillator 112 module to stop outputting the signal so as to cause the primary side control circuit 110 to be automatically turned off, and repeating Step 1 to restart the system;

Step 4, summing a feedback voltage value of an output feedback circuit 107 of the secondary side of the high-frequency transformer 102 and an output signal of a ripple injection module 125, comparing an obtained summed voltage value with a reference voltage value of a reference voltage circuit in the secondary side control circuit 120, and when two conditions that, the summed voltage value is smaller than the reference voltage value of the reference voltage circuit, and the demagnetization time of the current cycle is greater than or equal to the difference between the demagnetization time of the previous cycle and the iteration error amount, namely Tdem$^n$≥Tdem$^{n-1}$−ΔTdem, wherein in the formula, Tdem$^n$ is the demagnetization time of the nth switching with the unit being microsecond;

Tdem$^{n-1}$ is the demagnetization time of the (n−1)th switching with the unit being microsecond;

ΔTdem is the iteration error amount with the unit being nanosecond;

are met, a demagnetization time iteration control unit 124 in the secondary side control circuit 120 firstly turning off the secondary side synchronous rectifier tube 104 through a secondary side turn-off/turn-on unit 123 in the secondary side control circuit 120, and then sending a TX turn-on signal to the primary side control circuit 110 through the control signal modulation circuit 121 located in the secondary side control circuit 120 after delaying for several nanoseconds; the signal being coupled by the high-voltage capacitor isolation circuit 130 and demodulated by a control signal demodulation circuit 114 in the primary side control circuit 110 to generate an RX signal, then the RX signal being input into the adaptive turn-on time control circuit 115 located in the primary side control circuit 110, the adaptive turn-on time control circuit controlling the primary side power tube 103 to be turned on, and then the high-frequency transformer 102 obtaining excitation storage energy; meanwhile, the adaptive turn-on time control circuit 115 calculating the turn-on time of the primary side power tube 103 according to a primary side bus voltage VIN parameter of the high-frequency transformer 102 and automatically turning off the primary side power tube 103 after the time is reached, so as to enable the high-frequency transformer 102 to enter the demagnetization stage to output energy to the secondary side; the secondary side control circuit 120 turning on the secondary side synchronous rectifier tube 104 through the secondary side turn-off/turn-on unit 123 included in the secondary side control circuit, thereby ensuring that a load end of the secondary side of the high-frequency transformer 102 obtains energy supply; and Step 5, detecting a feedback voltage of the output feedback circuit 107 at the load end of the secondary side of the high-frequency transformer 102 in real time, and repeating Step 4 to realize energy transfer after power conversion from the primary side of the high-frequency transformer 102 to the secondary side of the high-frequency transformer 102.

The adaptive turn-on time control circuit 115 comprises a voltage division circuit 501 that is electrically connected with primary side bus voltage VIN, and a first voltage-controlled current source circuit 502 that is electrically connected with the voltage division circuit 501, wherein the first voltage-controlled current source circuit 502 generates bias current in direct proportion to the magnitude of the primary side bus voltage VIN, the first voltage-controlled current source circuit 502 is electrically connected with one end of a first capacitor 506, one end of a first switch 505 and a positive input end of a second comparator 508, the first switch 505 is controlled by a first one-shot circuit 503, the first one-shot circuit 503 is electrically connected with a trigger output end of the one-out-of-two selector 111 in the primary side control circuit 110, a negative input end of the second comparator is electrically connected with a positive electrode of a first reference voltage source 507, the other end of the first capacitor 506, the other end of the first switch 505, a negative electrode of the first reference voltage source 507 and a negative electrode of the primary side bus voltage VIN share a common ground, an output end of the second comparator 508 is electrically connected with an input end of a phase inverter 509, and an output end of the phase inverter 509 is electrically connected with a trigger end of the primary side power tube 103.

the turn-on time Ton of the primary side power tube 103 calculated by the adaptive turn-on time control circuit 115 according to the primary side bus voltage VIN parameter in Step 4 is:

$$Ton = C*V/(1/k*G*VIN),$$

wherein, VIN is primary side bus voltage of an input voltage bus 101 located at the primary side of the high-frequency transformer;

C is the capacitance value of the first capacitor 506;

V is the voltage value of the first reference voltage source 507;

1/k is the voltage division coefficient of the voltage division circuit 501;

G is a transconductance value of the first voltage-controlled current source circuit 502.

The present invention discloses a power conversion circuit adopting the demagnetization iteration control isolation type power conversion method, comprising:

a high-frequency transformer circuit used for voltage conversion transmission in power conversion, wherein the high-frequency transformer circuit comprises a high-frequency transformer 102, a primary side of the high-frequency transformer 102 is electrically connected with a primary side power tube 103 included in a power switch tube circuit, a secondary side of the high-frequency transformer 102 is electrically connected with a charging capacitor circuit and an output feedback circuit 107 through a secondary side synchronous rectifier tube 104, the charging capacitor circuit comprises a secondary side power supply capacitor 106, one end of the secondary side power supply capacitor is electrically connected to a secondary side positive output end of the high-frequency transformer 102 in the excitation stage, the other end of the secondary side power supply capacitor is electrically connected to a negative electrode of a secondary side load output end in the demagnetization stage, the charging capacitor circuit further comprises an output capacitor 105 connected across the secondary side load output end, the output feedback circuit 107 comprises a voltage division resistor $R_{FB1}$ and a voltage division resistor $R_{FB2}$ that are connected in series and are connected across the secondary side load output end, and the primary side and the secondary side of the high-frequency transformer 102 are electrically connected with a power conversion integrated control chip.

The power conversion integrated control chip internally comprises a primary side control circuit 110, a high-voltage capacitor isolation circuit 130 and a secondary side control circuit 120, wherein the primary side control circuit 110 is electrically connected with the power switch tube circuit; the secondary side control circuit 120 is electrically connected with the secondary side synchronous rectifier tube 104, the output feedback circuit 107 and the secondary side positive output end of the high-frequency transformer 102 in the excitation stage, and the secondary side control circuit 102 communicates with the primary side control circuit 110 through the high-voltage capacitor isolation circuit 130.

The primary side control circuit 110 internally comprises:

an oscillator module 112, used for providing a working pulse oscillation signal in the primary side control circuit 110;

a one-out-of-two selector 111, used for receiving the working pulse oscillation signal output by the oscillator module 112 and receiving a communication signal transmitted by the high-voltage capacitor isolation circuit 130;

a D trigger 113, used for receiving the communication signal transmitted by the high-voltage capacitor isolation circuit 130 and outputting a trigger result to a control end of the one-out-of-two selector 111 from an output end; and an adaptive turn-on time control circuit, used for receiving an output signal of the output end of the one-out-of-two selector and controlling the turn-on and turn-off time of the primary side power tube in the power switch tube circuit according to the magnitude of the primary side bus voltage VIN of the high-frequency transformer; wherein the oscillator module 112 is electrically connected with a '0' input end of the one-out-of-two selector 111, a '1' input end of the one-out-of-two selector 111 is electrically connected with an output end of a control signal demodulation circuit 121, a Q output end of the D trigger 113 is electrically connected with the control end of the one-out-of-two selector 111, a D input end of the D trigger 113 is electrically connected with a high level, a time sequence CLK input end of the D trigger 113 is electrically connected with the high-voltage capacitor isolation circuit 130 through the control signal demodulation circuit 121, and the output end of the one-out-of-two selector 111 is electrically connected with the adaptive turn-on time control circuit 115 included in the primary side control circuit 110.

the secondary side control circuit 120 internally comprises:

a power supply unit 126, used for being electrically connected with the secondary side positive output end of the high-frequency transformer 102 in the excitation stage to obtain electric energy, so as to charge the secondary side power supply capacitor 106 in the charging capacitor circuit;

a ripple injection module 125, used for providing a ripple signal required for summation with a feedback voltage value of the output feedback circuit 107;

a summator 128, used for summing the ripple signal and the feedback voltage value of the output feedback circuit 107;

a demagnetization time iteration control unit 124, used for realizing communication handshake control and demagnetization time iteration control between the secondary side control circuit 120 and the primary side control circuit 110 through the high-voltage capacitor isolation circuit 130;

a secondary side turn-off/turn-on unit 123, used for controlling turn-off/turn-on of the secondary side synchronous rectifier tube 104 and the demagnetization time iteration control unit 124;

a reference voltage circuit 129, used for providing a reference voltage value used for being compared with a summation result between the ripple signal and the feedback voltage value of the output feedback circuit 107;

a first comparator 127, used for comparing a summation result between the ripple signal and a feedback voltage value of the output feedback circuit 107 with a reference voltage value of the reference voltage circuit 129; and a control signal modulation circuit 121, used for modulating a communication handshake signal output by the demagnetization time iteration control unit 124.

The demagnetization time iteration control unit 124 comprises a second switch and a third switch, wherein a control end of the second switch is electrically connected with an output end of the secondary side turn-off/turn-on unit 123, a control end of the third switch is electrically connected with the output end of the secondary side turn-off/turn-on unit 123 through a pulse trigger circuit, a first base electrode of the second switch is electrically connected with a second voltage-controlled current source circuit, a second base electrode of the second switch is electrically connected with a first base electrode of the third switch and a positive input end of a third comparator TB, a second base electrode of the third switch and a negative electrode of the secondary side of the high-frequency transformer in the demagnetization stage share a common ground, the second base electrode of the second switch is further electrically connected with a first base electrode of a fourth switch and one end of a second capacitor, a second base electrode of the fourth switch is electrically connected with one end of a third capacitor, the second base electrode of the fourth switch is further electrically connected with a negative electrode of a positive iteration error amount voltage source and a positive electrode of a negative iteration error amount voltage source, a positive electrode of the positive iteration error amount voltage source is electrically connected with a negative input end of the third comparator TB through a fifth switch, a negative electrode of the negative iteration error amount voltage source is electrically connected with the negative input end of the third comparator TB through a sixth switch, an output end of the third comparator TB is electrically connected with a D input end of a second D trigger, a Q output end of the second D trigger is electrically connected with a control end of the fifth switch, a Q non-output end of the second D trigger is electrically connected with a control end of the sixth switch, and a control end of the fourth switch and a CP input end of the second D trigger are both electrically connected with an ONTRIG output end of the first comparator 127, and the output end of the third comparator TB is also electrically connected with the control signal modulation circuit 121.

The ripple injection module 125 comprises a seventh switch, wherein a control end of the seventh switch is electrically connected with the ONTRIG output end of the first comparator 127 through a second one-shot circuit, a first base electrode of the seventh switch is electrically connected with one end of a second reference voltage source, a second base electrode of the seventh switch is electrically connected with one end of a fourth capacitor and one end of a first resistor, the second base electrode of the seventh switch is further electrically connected with the summator 128, and the other end of the second reference voltage source, the other end of the fourth capacitor, the other end of the first resistor and the negative electrode of the secondary side of the high-frequency transformer 102 in the demagnetization stage share a common ground.

FIG. 1 is a block diagram of a system control circuit of a power conversion circuit of the present invention. The power conversion circuit comprises a high-frequency transformer 102 T1, a primary side power tube 103 $N_p$, a secondary side synchronous rectifier tube 104 $N_s$, a secondary side power supply capacitor 106 $C_{ss}$, an output capacitor 105 $C_{OUT}$, output voltage division resistors $R_{FB1}$ and $R_{FB2}$ in an output feedback circuit 107, a primary side control circuit 110, a secondary side control circuit 120 and a high-voltage capacitor isolation circuit 130.

Wherein the primary side control circuit 110 comprises a one-out-of-two selector 111, an oscillator module 112, a D trigger 113, a control signal demodulation circuit 114 and an adaptive turn-on time control circuit 115.

Wherein the secondary side control circuit 120 comprises a control signal modulation circuit 121, a high-level node 122, a secondary side turn-off/turn-on unit 123, a demagnetization time iteration control circuit 124, a ripple injection module 125, a power supply unit 126, a first comparator 127, a summator circuit 128 and a reference voltage circuit 129.

Here, the primary side control circuit 110, the secondary side control circuit 120 and the high-voltage capacitor isolation circuit 130 can be integrated in one chip.

Here, the high-voltage capacitor isolation circuit 130 comprises a signal isolation circuit such as a high-voltage isolation capacitor or a high-frequency isolation coil, and is used for realizing electrical isolation between the primary side control circuit and the secondary side control circuit and realizing a communication link between the primary side control circuit and the secondary side control circuit.

Before the system is powered on, the voltage of the secondary side power supply capacitor 106 $C_{SS}$ is zero, the voltage of the output capacitor 105 $C_{OUT}$ is zero, and the primary side control circuit 110 and the secondary side control circuit 120 are both maintained in a turn-off state.

When the system begins to be powered on, the initial value of the output end Q of the D trigger 113 is at the low level, and a signal at the '0' input end of the one-out-of-two selector 111 of a standard logic unit is gated. The initial output of the oscillator module 112 is at the low level, the initial value of the output end ONP of the adaptive turn-on time control circuit 115 is at the low level, and the primary side power tube 103 $N_P$ is maintained in a turn-off state. Afterwards, the oscillator module 112 in the primary side control circuit 110 starts to work, a pulse signal output by the oscillator module 112 triggers the adaptive turn-on time control circuit 115 to output a positive level pulse signal ONP after passing through the one-out-of-two selector 111, and the positive level pulse width of the ONP is inversely proportional to the magnitude of the primary side bus voltage VIN. When the ONP signal is in a positive level pulse stage, the primary side power tube 103 $N_P$ is turned on, and the primary side power tube 103, the input voltage bus 101 and the high-frequency transformer 102 T1 enter an excitation process.

In the excitation process, the dotted terminal of the high-frequency transformer 102 T1 is at a low level, the synonym terminal of the high-frequency transformer 102 T1 is at a high level, and the high-level node 122 corresponds to the synonym terminal of the high-frequency transformer 102 T1. In other words, the drain end signal $V_D$ of the secondary side synchronous rectifier tube 104 $N_S$ is at a high level, and the high level charges the secondary side power supply capacitor $C_{SS}$ through the power supply unit 126. The power supply unit 126 here is a one-way direct current source, when the voltage of the high-level node 122 $V_D$ is greater than the voltage of the secondary side power supply capacitor 106 $C_{SS}$, the power supply unit 126 charges the secondary side power supply capacitor 106 $C_{SS}$, and when the voltage of the $V_D$ is smaller than the voltage of the secondary side power supply capacitor 106 $C_{SS}$, the path through which the power supply unit 126 charges the secondary side power supply capacitor 106 $C_{SS}$ is disconnected without charging or discharging.

When the positive level pulse of the ONP signal is finished and becomes a low level, the primary side power tube 103 $N_P$ is turned off, the dotted terminal of the high-frequency transformer 102 T1 becomes a high level, the synonym terminal is at a low level relative to the dotted terminal, the high-frequency transformer 102 enters a demagnetization stage, energy in the high-frequency transformer 102 charges the output capacitor $C_{OUT}$ through a body diode of the secondary side synchronous rectifier tube 104 $N_S$, and the output voltage rises. At the moment, the secondary side synchronous rectifier tube 104 $N_S$ is maintained to be turned off, to prevent the primary side and the secondary side of the high-frequency transformer 102 from being turned on at the same time.

The output frequency of the oscillator module 112 can be set to be slightly greater than 20 KHz, so as to avoid the audio range.

Before the control signal demodulation circuit 114 receives the signal, the switching of the whole conversion circuit system is controlled by the oscillator module 112.

In one switching cycle, the secondary power supply capacitor 106 $C_{SS}$ can be charged only when the high-frequency transformer 102 T1 carries out excitation, and the amount of charges is related to the size of a current source of the power supply unit 126 and the excitation time of the high-frequency transformer 102 T1.

After a plurality of continuous switching cycles, the voltage of the secondary side power supply capacitor 106 $C_{SS}$ is gradually increased, when the voltage of the secondary side power supply capacitor 106 $C_{SS}$ reaches a set threshold value, the secondary side prepares to send a handshake signal, and establishes communication with the primary side after the handshake signal passes through the control signal modulation circuit 121, the high-voltage capacitor isolation circuit 130 and the control signal demodulation circuit 114.

The communication handshake process occurs in the demagnetization stage of the high-frequency transformer 102.

In a communication handshake process, the secondary side sends out a pulse signal TX, and the pulse signal TX is modulated by the control signal modulation circuit 121, coupled by the high-voltage capacitor isolation circuit 130 and demodulated by the control signal demodulation circuit 114 to generate an RX signal which is separately connected to a clock input end of the D trigger 113 and the one-out-of-two selector 111. The input end of the D trigger 113 is connected with a high level all the time, and after the D trigger 113 is triggered by the RX signal and the output end of the D trigger 113 is changed into the high level, the one-out-of-two selector 111 is controlled to select the RX signal at the '1' input end all the time. Thereafter, the ONP positive level pulse signal of the adaptive turn-on time control circuit 115 is triggered by the RX signal. The turn-on time of the primary side power tube 103 $N_P$ is the positive level pulse width of the ONP.

The secondary side turn-off/turn-on unit 123 detects the communication handshake process, and after the handshake between the primary side control circuit and the secondary side is successful, the secondary side synchronous rectifier tube 104 $N_s$ is controlled to be turned on and turned off.

In the handshake process of the primary side and the secondary side, the secondary side synchronous rectifier tube 104 $N_S$ is maintained to be turned off, and the primary side and the secondary side are prevented from being turned on at the same time.

If the primary side does not receive the communication handshake signal of the secondary side all the time, the primary side control circuit is automatically turned off after being controlled by the oscillator module 112 to be switched for dozens of switching cycles, and the system is restarted.

After the handshake is successful, the switching of the primary side power tube 103 $N_P$ and the switching of the secondary side synchronous rectifier tube 104 $N_S$ are both only controlled by the secondary side control unit 120.

After the handshake is successful, the secondary side synchronous rectifier tube 104 $N_S$ can be controlled by the secondary side control unit 120 to be turned on.

The $R_{FB1}$ and the $R_{FB2}$ are output feedback voltage division resistors, a feedback signal FB of the $R_{FB1}$ and the $R_{FB2}$ is input into one end of the secondary side summator circuit 128, after the feedback signal FB and an output signal FBB of the ripple injection module 125 are summed, an output FBS signal is connected to the negative input end of the first comparator 127, and the positive input end of the first comparator 127 is connected with a reference voltage value VR signal output by the reference voltage circuit 129.

When the FBS signal is smaller than the reference voltage value VR of the reference voltage circuit 129, it is indicated that the output voltage VOUT is smaller than the target value, and the primary side needs to transmit energy to the secondary side through the switching action of the primary side power tube 103 $N_P$. The turn-on of the primary side power tube 103 $N_P$ is simultaneously controlled by an output signal of the first comparator 127 and an output signal of the demagnetization time iteration control circuit 124, and the turn-off of the primary side power tube 103 $N_P$ is controlled by the adaptive turn-on time control circuit 115.

When the FBS signal is smaller than the reference voltage value VR of the reference voltage circuit 129, the signal ONTRIG output by the first comparator 127 is a high-level pulse which indicates that the system needs the primary side power tube 103 $N_P$ to be turned on to transmit energy to the secondary side, and the signal serves as one condition for turn-on of the primary side power tube 103 $N_P$. The turn-on opportunity of the primary side power tube 103 $N_P$ is controlled by the demagnetization time iteration control circuit 124, which is another condition for turn-on of the primary side power tube 103 $N_P$. When the two conditions are both met, the demagnetization time iteration control circuit 124 outputs a primary side power tube 103 $N_P$ switching request signal TX, and the switching request signal TX is transmitted to the primary side after being modulated by the control signal modulation circuit 121, coupled by the high-voltage capacitor isolation circuit 130 and demodulated by the control signal demodulation circuit 114 to generate a signal RX; the signal RX is input into the adaptive turn-on time control circuit 115 through the one-out-of-two selector 111 to generate a switching signal ONP. The above working states are executed circularly, so that energy is transmitted from the primary side to the secondary side.

The switching frequency of the system based on demagnetization iteration control is variable, so that the right-half-plane zero is eliminated, and the EMI performance of the system is improved due to frequency jitter.

Figure 2:
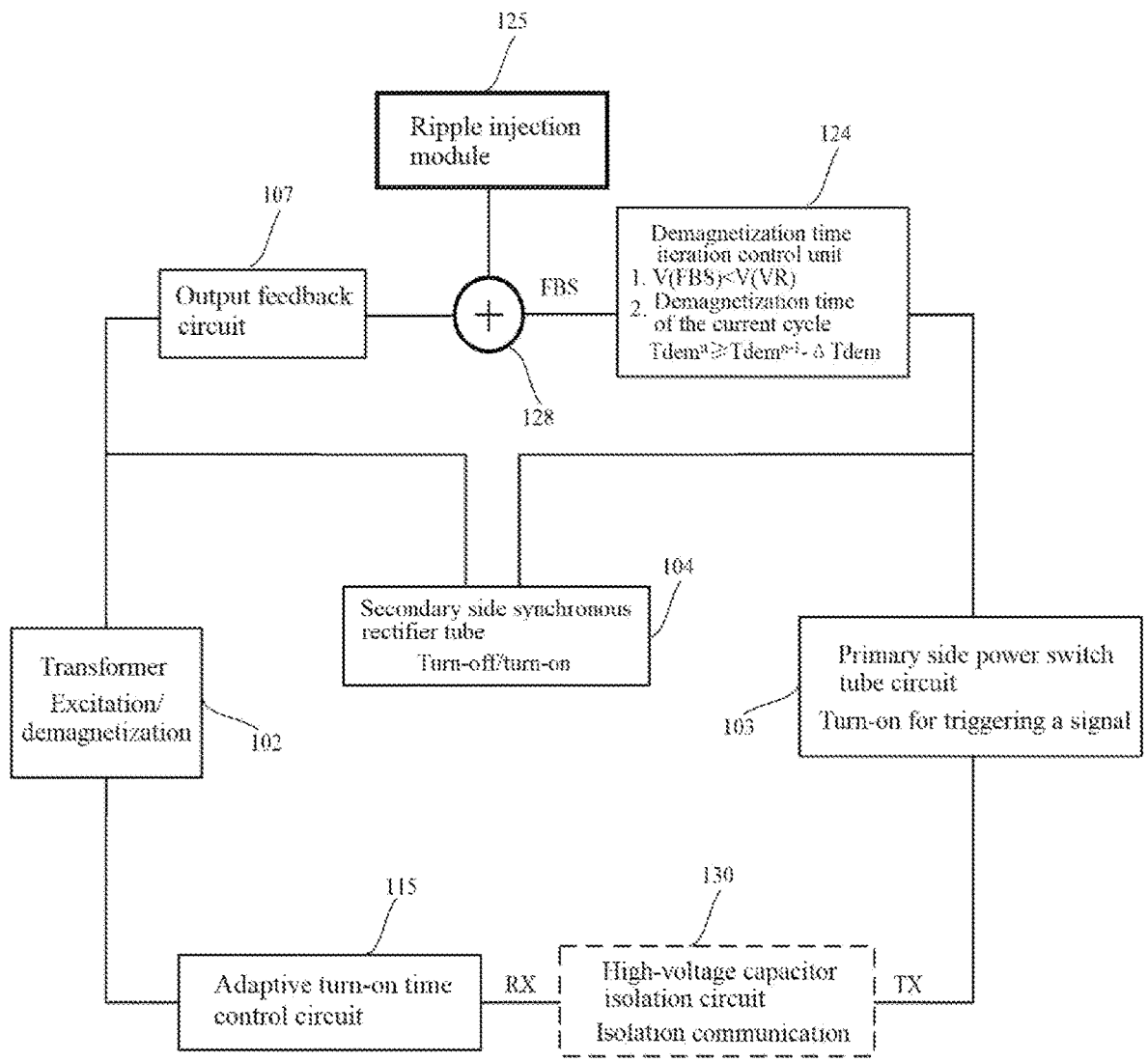
FIG. 2 is a schematic diagram of loop control of a system control circuit of a power conversion circuit of the present invention.

FIG. 2 is a schematic diagram of loop control of a control circuit of a power conversion circuit system. A signal of the output feedback circuit 107 of the secondary side and a signal of the ripple injection module 125 are summed through the summator 128 to generate an FBS signal which is then input into the demagnetization time iteration control unit 124; when the system meets the two conditions that the FBS voltage is smaller than the reference voltage value VR (V(FBS)<V(VR)) of the reference voltage circuit 129 and the demagnetization time $Tdem^n$ of the current cycle is greater than or equal to the difference between the demagnetization time of the previous cycle and the iteration error amount ($Tdem^{n-1} - \Delta Tdem$), the demagnetization time iteration control unit 124 firstly sends a signal through the secondary side turn-off/turn-on unit 123 in the secondary side control circuit 120, the secondary side synchronous rectifier tube 104 $N_s$ is turned off, a turn-on signal TX is sent to the primary side power tube 103 $N_P$ electrically connected to the primary side of the high-frequency transformer 102 after delaying for several nanoseconds, the signal is coupled and transmitted through the high-voltage capacitor isolation circuit 130 to generate an RX signal, the RX signal is input into the adaptive turn-on time control circuit 115, the adaptive turn-on time control circuit 115 controls the primary side power tube 103 $N_P$ to be turned on, and the high-frequency transformer 102 carries out excitation to store energy, meanwhile, the adaptive turn-on time control circuit 115 can calculate the turn-on time of the primary side power tube 103 $N_P$ according to parameters such as primary side bus voltage VIN, the primary side power tube 103 $N_P$ is automatically turned off after the time is reached, the high-frequency transformer 102 carries out demagnetization to output energy to the secondary side, at the moment, the secondary side detects that demagnetization of the high-frequency transformer 102 starts, the secondary side synchronous rectifier tube 104 $N_s$ is turned on through the secondary side turn-off/turn-on unit 123, and meanwhile the secondary side detects an output feedback signal in real time for preparing for the work in the next cycle.

Figure 3:
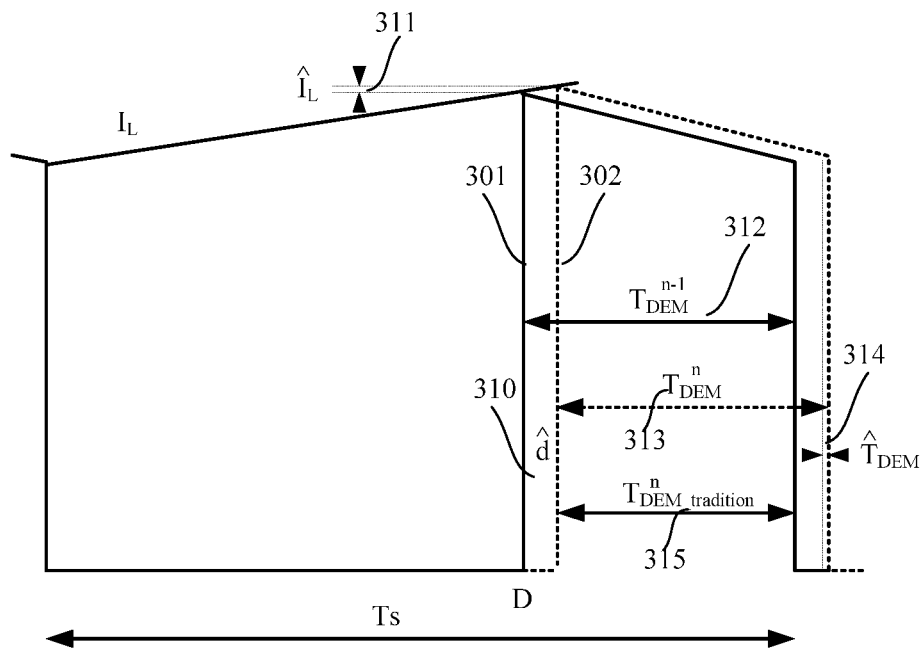
FIG. 3 is a schematic diagram of a demagnetization time iterative control principle of the present invention.

FIG. 3 is a schematic diagram of a demagnetization time iterative control principle. In the figure, 301 represents the (n−1)th switching current waveform, 302 represents the nth switching current waveform, 310 represents the duty ratio variable amount from the (n−1)th switching to the nth switching, 311 represents the current variable amount from the (n−1)th switching to the nth switching, 312 represents the demagnetization time of the (n−1)th switching, 313 represents the demagnetization time of the nth switching of the present invention, 314 represents the iteration error amount of the demagnetization time, and 315 represents the demagnetization time of the nth switching in a traditional control method.

When the duty ratio from the (n−1)th switching to the nth switching is slightly increased by $\Delta d$, the demagnetization time in the traditional control method is correspondingly reduced by $\Delta d \ast Ts$ (Ts here represents the time of one switching cycle), such as the time corresponding to 315 in the figure, although the current is also increased by $\Delta I_L$ due to the increase of the duty ratio, the average current output in the demagnetization stage is reduced due to the reduction of the demagnetization time, and therefore, the system has a right-half-plane zero.

The demagnetization time described in the present invention is obtained through iterative calculation, that is, the demagnetization time of the nth switching is greater than or equal to the difference between the demagnetization time of the (n−1)th switching and the iteration error amount $\Delta Tdem$ ($Tdem^n \geq Tdem^{n-1} - \Delta Tdem$), by controlling the iteration error amount $\Delta Tdem$ (dozens of nanoseconds to hundreds of nanoseconds), it is guaranteed that when the duty ratio of the system is increased, the output average current can also be increased, and therefore the right-half-plane zero is eliminated, the loop bandwidth is increased, and the system response speed is improved.

Figure 4:
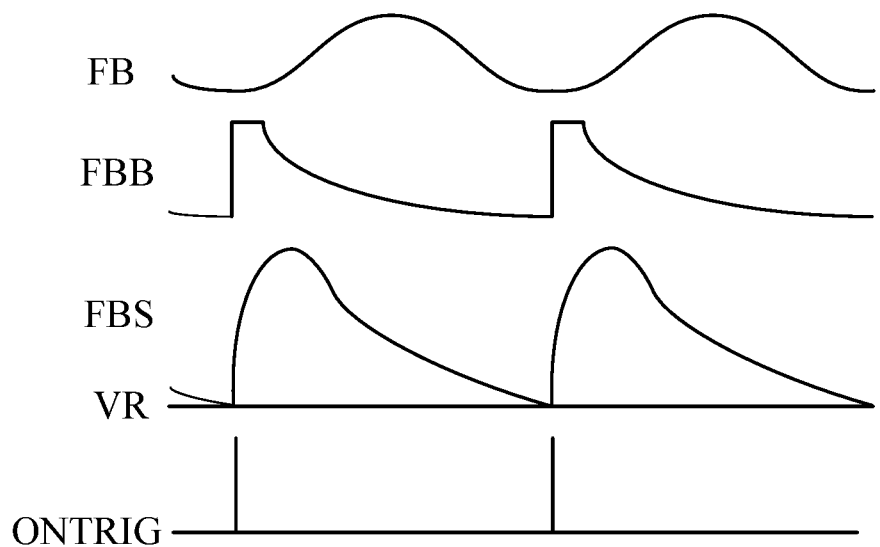
FIG. 4 is a schematic diagram of the waveform of a ripple injection signal of the present invention.

FIG. 4 is a schematic diagram of the waveform of a ripple injection signal of the present invention. In the figure, FB represents an output feedback signal, FBB is a ripple injection signal, FBS is the sum of the FB and FBB signals, VR is a reference voltage value of the reference voltage circuit 129, and ONTRIG is an output signal of the first comparator 127.

The ripple injection signal FBB sent by the ripple injection module 125 is synchronous with an ONTRIG signal, when the ONTRIG signal is changed from low to high, the FBB signal rises instantaneously and falls exponentially after maintaining for dozens of nanoseconds, and the variation amplitude of the FBB signal is generally dozens of millivolts.

Compared with the FB signal, the valley bottom change of the summed FBS signal is steep, and after the summed FBS signal intersects with the reference voltage value VR of the reference voltage circuit 129, an output signal is reversed cleanly and uniquely, so that the situation that an ONTRIG signal is generated randomly due to noise, and consequently system work disorder is caused is avoided. According to the method, the influence of signal noise interference during high-speed dynamic response is eliminated through a ripple injection method, and the system stability is improved.

Figure 5:
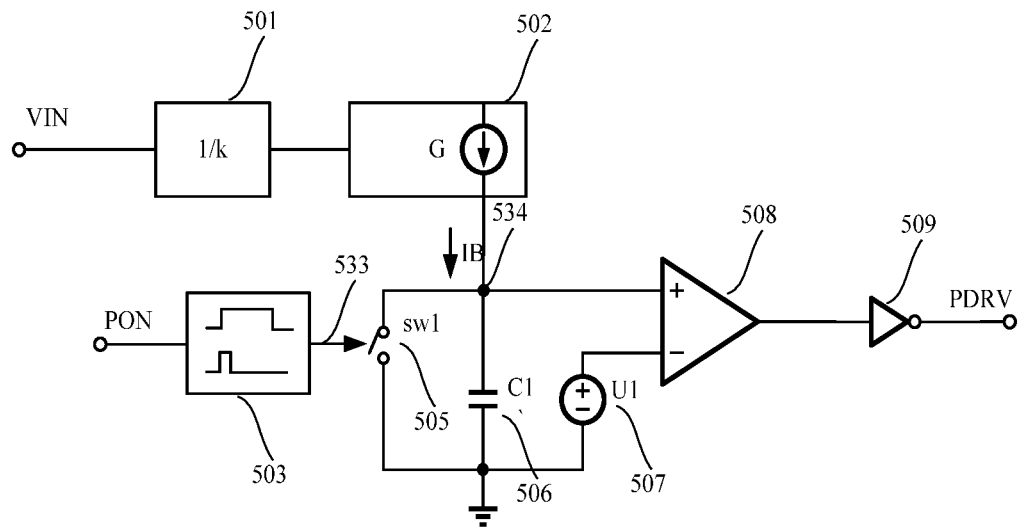
FIG. 5 is a schematic diagram of an adaptive turn-on time control circuit of the present invention.

FIG. 5 is a schematic diagram of an adaptive turn-on time control circuit. The adaptive turn-on time control circuit comprises a voltage division circuit 501, a first voltage-controlled current source circuit 502, a first one-shot circuit 503, a first switch 505, a first capacitor 506, a first reference voltage source 507 U1, a second comparator 508 and a phase inverter 509.

A bias current IB in direct proportion to the primary side bus voltage VIN in magnitude is generated through the voltage division circuit 501 and the first voltage-controlled current source circuit 502, and the bias current IB immediately enters the positive input end of the second comparator 508 through a node 534.

The output voltage of the first reference voltage source 507 is a generally set at the volt level and is connected to the negative input end of the second comparator 508.

In the initial state, the PON signal output by the output end of the one-out-of-two selector 111 is at the low level, the output signal of the first one-shot circuit 503 is at the low level through a node 533, the first switch 505 is turned off, a bias current IB charges the first capacitor 506, the node 534 is at the high level and is greater than the output voltage of the first reference voltage source 507, the second comparator 508 outputs the high level, after passing through the phase inverter 509, the output signal PDRV is at the low level, the signal is connected to a gate of the primary side power tube 103 $N_P$, and the primary side power tube 103 $N_P$ is turned off.

When the PON signal changes from low to high, the first one-shot circuit 503 outputs a positive pulse signal, the first switch 505 is transiently turned on, the first capacitor 506 discharges rapidly to the ground, the node 534 is at the zero level, the second comparator 508 outputs a low level, the PDRV signal changes from low level to high level, and the primary side power tube 103 $N_P$ is turned on. After being transiently turned on, the first switch 505 returns to the turn-off state, the bias current IB charges the first capacitor 506 again, the voltage of the node 534 rises continuously, and when the level of the node 534 is greater than the output voltage of the first reference voltage source 507, the second comparator 508 outputs a high level, the PDRV signal returns to the low level again, and the primary side power tube 103 $N_P$ is turned off.

The turn-on of the primary side power tube 103 $N_P$ is synchronous with the rising edge of the PON signal, and the turn-off of the primary side power tube 103 $N_P$ is controlled by the charging time of the first capacitor 506.

The turn-on time Ton of the primary power tube 103 $N_P$ is Ton=C(506)*V(507)/(1/k*G*VIN), and the primary bus voltage VIN has a formula VIN*Ton=$I_L$*Lp, so that $I_L$=C(506)*V(507)/(1/k*G*Lp) can be obtained, wherein, C(506) is the capacitance value of the first capacitor 506, V(507) is the voltage of the first reference voltage source 507, 1/k is the voltage division coefficient of 501, G is the transconductance of 502, Lp is the primary inductance of the high-frequency transformer 102, and $I_L$ is the primary excitation current of the high-frequency transformer 102. Wherein the value range of C(506) is several to 10 picofarads, and the value range of V(507) is several volts, such as 2 volts. The value range of 1/k is 0.001-0.005, and the value range of G is a 10e-6 level. The primary excitation current of the high-frequency transformer 102 is controlled by the constant, so that an excitation current sampling resistor is omitted, the system cost is reduced, and the system reliability is improved.

Figure 6:
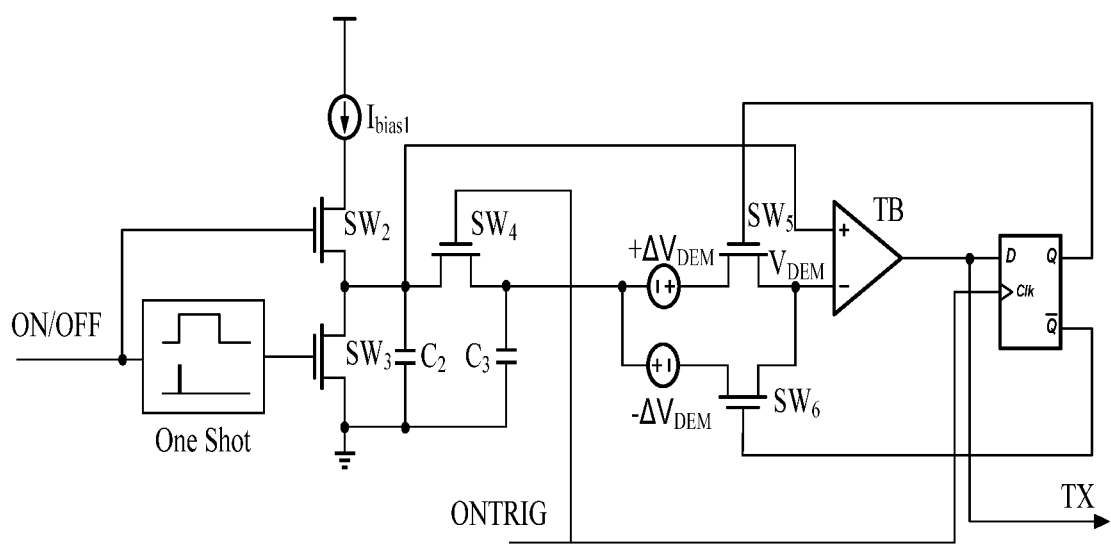
FIG. 6 is a principle schematic diagram of a demagnetization time iteration control unit of the present invention.

In FIG. 6, under the high level control of the output end of the secondary side turn-off/turn-on unit 123, the second switch $SW_2$ is turned on, the third switch $SW_3$ is instantly turned on under the action of a single-pulse trigger circuit One Shot to empty residual charges of the second capacitor $C_2$, then a second voltage-controlled current source circuit $I_{bias1}$ charges the second capacitor $C_2$ at the Tdem″ stage through the second switch $SW_2$, the charging time of Tdem″ is t=C*V/I, wherein C is the second capacitor $C_2$ in FIG. 6, the charging current I is fixed, and different primary side bus voltages VIN electrically connected with the primary end of the high-frequency transformer 102 correspond to different t time. After charging is completed, the voltage value acts on the positive input end of the first comparator 127 at the same time, when the first comparator 127 meets the condition that the summed voltage value is smaller than the reference voltage value of the reference voltage circuit, the ONTRIG end outputs a high level, the high level acts on the CP input end of a second D trigger at the same time, and the Q output end of the second D trigger outputs a high level, so that a fourth switch $SW_4$ and a fifth switch $SW_5$ are turned on. A third capacitor $C_3$ latches a charging voltage value of which the charging time is Tdem″⁻¹, and the first comparator 127 executes the comparative judgment that the demagnetization time of the current cycle is greater than or equal to the difference between the demagnetization time of the previous cycle and the iteration error amount, i.e. Tdem″≥Tdem″⁻¹−Δtdem, when conditions are met, a high-level comparison result is output, the result sends a TX turn-on signal to the primary side control circuit through the control signal modulation circuit 121 in the secondary side control circuit 120, and otherwise, a low-level comparison result is output as the TX turn-on signal.

Figure 7:
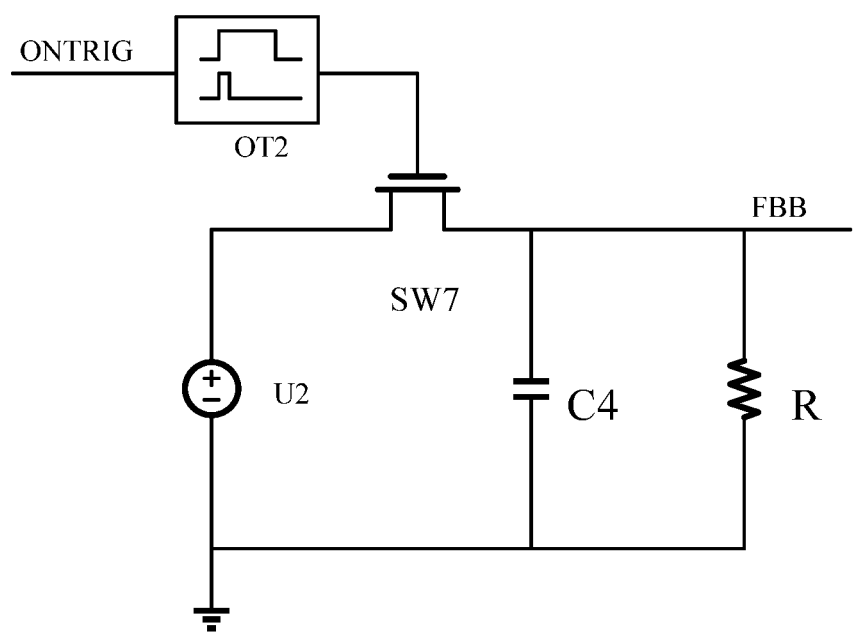
FIG. 7 is a principle schematic diagram of a ripple injection module of the present invention.

In FIG. 7, the second one-shot circuit OT2 at the output end of the first comparator 127 outputs a high level, the seventh switch SW7 is turned on, the second reference voltage source U2 charges the fourth capacitor C4, and the voltage value acts on the summator 128 end as a ripple injection signal FBB; when the output end ONTRIG of the first comparator 127 outputs a low level, the seventh switch SW7 is turned off, and the first resistor R provides a charge release loop for the fourth capacitor C4.

In this description, the particular features, structures, materials, or features described are included in at least one embodiment or example of the present invention. The above illustrative representation does not necessarily refer to the same embodiment or example. Moreover, the specific features, structures, materials, or features described may be combined in any one or more embodiments or examples in a suitable manner. Although embodiments of the present invention have been shown and described, it will be understood by those of ordinary skill in the art that various changes, modifications, substitutions and alterations can be made to these embodiments without departing from the principles and spirit of the present invention, and the scope of the present invention is defined by the claims and their equivalents.

What is claimed is:

1. An isolation type power conversion method based on demagnetization iteration control, characterized by comprising a plurality of steps, wherein:

step 1, a high-frequency transformer circuit of a power conversion circuit comprising a high-frequency transformer, at a beginning of power-on, a secondary side control circuit of the high-frequency transformer maintains a turn-off state, a primary side control circuit of the high-frequency transformer comprising an oscillator module, a one-out-of-two selector and an adaptive turn-on time control circuit, the oscillator module in the primary side control circuit triggering the adaptive turn-on time control circuit through a '0' input end of the one-out-of-two selector, the adaptive turn-on time control circuit controlling a primary side power tube in a power switch tube circuit electrically connected with the adaptive turn-on time control circuit to be turned on so as to enable the high-frequency transformer to enter an excitation stage, the high-frequency transformer charging a secondary side power supply capacitor in a charging capacitor circuit electrically connected to a secondary side of the high-frequency transformer in the excitation stage through a power supply unit in the secondary side control circuit, a positive electrode end of the secondary side power supply capacitor being electrically connected to a secondary side positive output end of the high-frequency transformer in the excitation stage through the power supply unit, and a negative electrode end of the secondary side power supply capacitor being electrically connected to a negative electrode of a secondary side load output end in a demagnetization stage;

step 2, when the adaptive turn-on time control circuit controls the primary side power tube in the power switch tube circuit to be turned off, the high-frequency transformer entering the demagnetization stage, the high-frequency transformer charging an output capacitor in the charging capacitor circuit electrically connected to the secondary side of the high-frequency transformer in the demagnetization stage, wherein, the secondary side control circuit still maintains the turn-off of a secondary side synchronous rectifier tube electrically connected with the secondary side of the high-frequency transformer so as to prevent a primary side and the secondary side of the high-frequency transformer from being turned on at a same time;

step 3, after a plurality of continuous excitation stages under a control of the oscillator module and the adaptive turn-on time control circuit are completed, and a charging voltage of the secondary side power supply capacitor reaches a set threshold value, the secondary side control circuit sending a pulse communication signal to the primary side control circuit through a high-voltage capacitor isolation circuit by using a control signal modulation circuit located in the secondary side control circuit in order to establish a communication handshake with the primary side control circuit in the demagnetization stage, the one-out-of-two selector in the primary side control circuit selecting a demodulated communication signal obtained by a '1' input end to trigger the adaptive turn-on time control circuit only after the communication handshake is successful, therefore, a turn-on and turn-off of the secondary side synchronous rectifier tube and the primary side power tube controlled by the adaptive turn-on time control circuit being both only controlled by the secondary side control circuit, under a condition that the primary side control circuit does not receive a communication handshake signal of the secondary side control circuit, and after the primary side control circuit controls the primary side power tube for dozens of switching cycles by using the oscillator module, a logic circuit which is arranged in the oscillator module and functions as a microcontroller controlling the oscillator module to stop outputting a signal so as to cause the primary side control circuit to be automatically turned off, and repeating Step 1 to restart the demagnetization iteration control;

step 4, summing a feedback voltage value of an output feedback circuit of the secondary side of the high-frequency transformer and an output signal of a ripple injection module, comparing an obtained summed voltage value with a reference voltage value of a reference voltage circuit in the secondary side control circuit, and when two conditions that, the summed voltage value is smaller than the reference voltage value of the reference voltage circuit, and the demagnetization time of the current cycle is greater than or equal to the difference between a demagnetization time of a previous cycle and an iteration error amount, namely $Tdem^n \geq Tdem^{n-1} - \Delta Tdem$, wherein $Tdem^n$ is a demagnetization time of an nth switching with a unit being microsecond;

$Tdem^{n-1}$ is a demagnetization time of an (n−1) switching with a unit being microsecond;

$\Delta Tdem$ is the iteration error amount with a unit being nanosecond;

are met, a demagnetization time iteration control unit in the secondary side control circuit turning off the secondary side synchronous rectifier tube through a secondary side turn-off/turn-on unit in the secondary side control circuit, and sending a TX turn-on signal to the primary side control circuit through the control signal modulation circuit located in the secondary side control circuit after delaying for several nanoseconds; a signal being coupled by the high-voltage capacitor isolation circuit and demodulated by a control signal demodulation circuit in the primary side control circuit to generate an RX signal, the RX signal being input into the adaptive turn-on time control circuit located in the primary side control circuit, the adaptive turn-on time control circuit controlling the primary side power tube to be turned on, and the high-frequency transformer obtaining excitation storage energy; the adaptive turn-on time control circuit calculating the turn-on time of the primary side power tube according to a primary side bus voltage VIN parameter of the high-frequency transformer and automatically turning off the primary side power tube after the turn-on time is reached, so as to enable the high-frequency transformer to enter the demagnetization stage to output energy to the secondary side; the secondary side control circuit turning on the secondary side synchronous rectifier tube through the secondary side turn-off/turn-on unit comprised in the secondary side control circuit, thereby ensuring that a load end of the secondary side of the high-frequency transformer obtains an energy supply; and step 5, detecting a feedback voltage of the output feedback circuit at the load end of the secondary side of the high-frequency transformer in real time, and repeating Step 4 to realize energy transfer after power conversion from the primary side of the high-frequency transformer to the secondary side of the high-frequency transformer.

2. The isolation type power conversion method based on demagnetization iteration control according to claim 1, characterized in that the adaptive turn-on time control circuit comprises a voltage division circuit that is electrically connected with a primary side bus voltage VIN, and a first voltage-controlled current source circuit that is electrically connected with the voltage division circuit, wherein the first voltage-controlled current source circuit generates a bias current in direct proportion to a magnitude of the primary side bus voltage VIN, the first voltage-controlled current source circuit is electrically connected with one end of a first capacitor, one end of a first switch and a positive input end of a second comparator, the first switch is controlled by a first one-shot circuit, the first one-shot circuit is electrically connected with a trigger output end of the one-out-of-two selector in the primary side control circuit, a negative input end of the second comparator is electrically connected with a positive electrode of a first reference voltage source, an other end of the first capacitor, an other end of the first switch, a negative electrode of the first reference voltage source and a negative electrode of the primary side bus voltage VIN share a common ground; an output end of the second comparator is electrically connected with an input end of a phase inverter, and an output end of the phase inverter is electrically connected with a trigger end of the primary side power tube.

3. The isolation type power conversion method based on demagnetization iteration control according to claim 2, characterized in that the turn-on time Ton of the primary side power tube calculated by the adaptive turn-on time control circuit according to the primary side bus voltage VIN parameter in Step 4 is:

Ton=C*V/(l/k*G*VIN), wherein, VIN is primary side bus voltage of an input voltage bus located at the primary side of the high-frequency transformer;

C is a capacitance value of the first capacitor;

V is a voltage value of the first reference voltage source;

l/k is a voltage division coefficient of the voltage division circuit;

G is a transconductance value of the first voltage-controlled current source circuit.

4. A power conversion circuit adopting the isolation type power conversion method based on demagnetization iteration control according to claim 3, characterized by comprising:

a high-frequency transformer circuit used for voltage conversion transmission in the power conversion conversion, wherein the high-frequency transformer circuit comprises the high-frequency transformer, the primary side of the high-frequency transformer is electrically connected with the primary side power tube comprised in the power switch tube circuit, the secondary side of the high-frequency transformer is electrically connected with the charging capacitor circuit and the output feedback circuit through the secondary side synchronous rectifier tube, the charging capacitor circuit comprises the secondary side power supply capacitor, one end of the secondary side power supply capacitor is electrically connected to a secondary side positive output end of the high-frequency transformer in the excitation stage, the other end of the secondary side power supply capacitor is electrically connected to the negative electrode of a secondary side load output end in the demagnetization stage, the charging capacitor circuit further comprises the output capacitor connected across the secondary side load output end, the output feedback circuit comprises a voltage division resistor $R_{FB1}$ and a voltage division resistor $R_{FB2}$ that are connected in series and are connected across the secondary side load output end, and the primary side and the secondary side of the high-frequency transformer are electrically connected with a power conversion integrated control chip.

5. The power conversion circuit adopting the isolation type power conversion method based on demagnetization iteration control according to claim 4, characterized in that the power conversion integrated control chip internally comprises the primary side control circuit, the high-voltage capacitor isolation circuit and the secondary side control circuit, wherein the primary side control circuit is electrically connected with the power switch tube circuit; the secondary side control circuit is electrically connected with the secondary side synchronous rectifier tube, the output feedback circuit and the secondary side positive output end of the high-frequency transformer in the excitation stage, and the secondary side control circuit communicates with the primary side control circuit through the high-voltage capacitor isolation circuit.

6. The power conversion circuit adopting the isolation type power conversion method based on demagnetization iteration control according to claim 5, characterized in that the primary side control circuit internally comprises:

the oscillator module, used for providing the working pulse oscillation signal in the primary side control circuit;

the one-out-of-two selector, used for receiving the working pulse oscillation signal output by the oscillator module and receiving the communication signal transmitted by the high-voltage capacitor isolation circuit;

a D trigger, used for receiving the communication signal transmitted by the high-voltage capacitor isolation circuit and outputting a trigger result to a control end of the one-out-of-two selector from an output end; and the adaptive turn-on time control circuit, used for receiving an output signal of the output end of the one-out-of-two selector and controlling the turn-on and turn-off time of the primary side power tube in the power switch tube circuit according to the magnitude of the primary side bus voltage VIN of the high-frequency transformer; wherein the oscillator module is electrically connected with a '0' input end of the one-out-of-two selector, a '1' input end of the one-out-of-two selector is electrically connected with an output end of a control signal demodulation circuit, a Q output end of the D trigger is electrically connected with the control end of the one-out-of-two selector, a D input end of the D trigger is electrically connected with a high level, a time sequence CLK input end of the D trigger is electrically connected with the high-voltage capacitor isolation circuit through the control signal demodulation circuit, and the output end of the one-out-of-two selector is electrically connected with the adaptive turn-on time control circuit comprised in the primary side control circuit.

7. The power conversion circuit adopting the isolation type power conversion method based on demagnetization iteration control according to claim 6, characterized in that the secondary side control circuit internally comprises:

the power supply unit, electrically connected with the secondary side positive output end of the high-frequency transformer in the excitation stage to obtain electric energy, so as to charge the secondary side power supply capacitor in the charging capacitor circuit;

the ripple injection module, used for providing a ripple signal required for summation with a feedback voltage value of the output feedback circuit;

a summator, used for summing the ripple signal and the feedback voltage value of the output feedback circuit;

the demagnetization time iteration control unit, used for realizing the communication handshake control and demagnetization time iteration control between the secondary side control circuit and the primary side control circuit through the high-voltage capacitor isolation circuit;

the secondary side turn-off/turn-on unit, used for controlling turn-off/turn-on of the secondary side synchronous rectifier tube and the demagnetization time iteration control unit;

a reference voltage circuit, used for providing the reference voltage value used for being compared with a summation result between the ripple signal and the feedback voltage value of the output feedback circuit;

a first comparator, used for comparing the summation result between the ripple signal and the feedback voltage value of the output feedback circuit with the reference voltage value of the reference voltage circuit; and the control signal modulation circuit, used for modulating the communication handshake signal output by the demagnetization time iteration control unit.

8. The power conversion circuit adopting the isolation type power conversion method based on demagnetization iteration control according to claim 7, characterized in that the demagnetization time iteration control unit comprises a second switch and a third switch, wherein a control end of the second switch is electrically connected with an output end of the secondary side turn-off/turn-on unit, a control end of the third switch is electrically connected with the output end of the secondary side turn-off/turn-on unit through a pulse trigger circuit, a first base electrode of the second switch is electrically connected with a second voltage-controlled current source circuit, a second base electrode of the second switch is electrically connected with a first base electrode of the third switch and a positive input end of a third comparator TB, a second base electrode of the third switch and a negative electrode of the secondary side of the high-frequency transformer in the demagnetization stage share a common ground, the second base electrode of the second switch is further electrically connected with a first base electrode of a fourth switch and one end of a second capacitor, a second base electrode of the fourth switch is electrically connected with one end of a third capacitor, the second base electrode of the fourth switch is further electrically connected with a negative electrode of a positive iteration error amount voltage source and a positive electrode of a negative iteration error amount voltage source, a positive electrode of the positive iteration error amount voltage source is electrically connected with a negative input end of the third comparator TB through a fifth switch, a negative electrode of the negative iteration error amount voltage source is electrically connected with the negative input end of the third comparator TB through a sixth switch, an output end of the third comparator TB is electrically connected with a D input end of a second D trigger, a Q output end of the second D trigger is electrically connected with a control end of the fifth switch, a Q non-output end of the second D trigger is electrically connected with a control end of the sixth switch, and a control end of the fourth switch and a CP input end of the second D trigger are both electrically connected with an ONTRIG output end of the first comparator, and the output end of the third comparator TB is also electrically connected with the control signal modulation circuit.

9. The power conversion circuit adopting the isolation type power conversion method based on demagnetization iteration control according to claim 8, characterized in that the ripple injection module comprises a seventh switch, wherein a control end of the seventh switch is electrically connected with the ONTRIG output end of the first comparator through a second one-shot circuit, a first base electrode of the seventh switch is electrically connected with one end of a second reference voltage source, a second base electrode of the seventh switch is electrically connected with one end of a fourth capacitor and one end of a first resistor, the second base electrode of the seventh switch is further electrically connected with the summator, and the other end of the second reference voltage source, the other end of the fourth capacitor, the other end of the first resistor and the negative electrode of the secondary side of the high-frequency transformer in the demagnetization stage share a common ground.

\* \* \* \* \*